United States Patent
Gvily et al.

(10) Patent No.: US 6,502,094 B1
(45) Date of Patent: Dec. 31, 2002

(54) RELATION PATH VIABILITY PREDICTION

(75) Inventors: Yaniv Gvily, Morgan Hill, CA (US); Shai Agassi, Los Gatos, CA (US)

(73) Assignee: SAP Portals, Inc., San Jose, CA (US)

( * ) Notice: Subject to any disclaimer, the term of this patent is extended or adjusted under 35 U.S.C. 154(b) by 286 days.

(21) Appl. No.: 09/606,872

(22) Filed: Jun. 28, 2000

Related U.S. Application Data (60) Provisional application No. 60/142,138, filed on Jul. 2, 1999.

(51) Int. Cl.$^7$ .............................................. G06F 17/30
(52) U.S. Cl. .......................................... 707/5; 707/102
(58) Field of Search ............................ 707/2, 3, 5.102, 707/6; 705/51; 702/159; 713/201

(56) References Cited

U.S. PATENT DOCUMENTS

| | | | |
|---|---|---|---|
| 4,751,635 A | | 6/1988 | Kret |
| 5,412,806 A | | 5/1995 | Du et al. |
| 5,671,436 A | | 9/1997 | Morris et al. |
| 5,748,953 A | * | 5/1998 | Mizutani et al. ............. 707/500 |
| 5,760,773 A | * | 6/1998 | Berman et al. ............. 345/672 |
| 5,848,424 A | * | 12/1998 | Scheinkman et al. ....... 345/738 |
| 5,966,730 A | * | 10/1999 | Zulch ......................... 707/202 |
| 5,983,220 A | * | 11/1999 | Schmitt ...................... 707/102 |
| 6,282,551 B1 | * | 8/2001 | Anderson et al. ........... 345/777 |

* cited by examiner

*Primary Examiner*—Wayne Amsbury
*Assistant Examiner*—Sana Al-hashemi
(74) *Attorney, Agent, or Firm*—Townsend and Townsend and Crew LLP (57) ABSTRACT

There is provided a process for predicting whether a query will produce a result in an information system formed of objects having different instances and relations between the objects. An instance-to-object bitmap is computed off-line, before queries are generated by a user: the bitmap is used to represent the existence of a relation path from instances to the other objects of a database. When a query is generated, the bitmap is accessed to predict whether there exists a relation from the instance to the object, that is whether the query will issue a result. The process makes it possible for a user to abort queries without consuming run-time. It also makes it possible to guide users through navigation of a Webpage or the like, by suggesting relations that will produce results.

23 Claims, 5 Drawing Sheets

RELATION PATH VIABILITY PREDICTION

CROSS-REFERENCES TO RELATED APPLICATIONS

This patent application claims the benefit of U.S. Provisional Patent Application Serial No. 60/142,138, filed Jul. 2, 1999, the entirety of which is incorporated herein by reference for all purposes.

BACKGROUND OF THE INVENTION

The present invention relates generally to systems and methods for predicting the success of queries in information systems comprised of objects and relations between the objects. More particularly, the present invention relates to systems and methods for predicting whether an instance relates to an object without performing an actual query.

As information systems, and especially database systems, grow larger and larger (e.g., into the terra-byte range), so does the cost of querying the databases efficiently. It is not uncommon for a user to hit a database with a complex query only to get "no matching records found" after long minutes of waiting. These empty queries take valuable server resources without producing any useful results.

As the web gains in popularity, the number of users that are allowed to concurrently access or hit such information systems has increased dramatically. Some web sites receive millions of hits per day. It has become increasingly important to be able to detect empty queries and filter them out before they consume valuable resources.

Some of the problems associated with predicting whether a query will produce no records include determining how to know in advance if an instance is related to an object (in other words, are there any instances of that object that relate to the original instance) and, how to do this without accessing the information system or database at run-time. Another problem is to list all the objects to which a particular instance relates.

Some databases currently known in the art support some kind of query cost analysis and prediction. Based on table, index and join-index sizes, the database is able to estimate the time needed to run the query. A smart client will abort queries that will take too long. That gives the user the choice to abort a query based on its cost while this invention enables the user to abort a query based on its predicted result.

Many databases also keep instance-to-instance index tables. If two tables are related through a foreign-key/primary-key relation, the database typically will keep a B-tree index, which has a key that is the foreign-key, and which includes leaves that contain a number pointing to the index file of the primary-key. This permits the database to quickly find all the primary-keys to which specific foreign-keys relate. However, a problem with these B-tree indexes is that they are designed to answer a query, not predict the query result before the query is run. In addition, these tables typically are kept for objects immediately neighboring (i.e., where a direct relation exists).

U.S. Pat. No. 5,848,424 issued on Dec. 8, 1998 to Scheinkman et al., which is incorporated by reference herein for all purposes, discloses a data navigation interface with navigation as a function of draggable elements and drop targets. The interface is based on a drag-and-drop paradigm, whereby the user may drag a draggable element and drop it over a drop target element to create a query. The system makes it possible for the user to generate easily arbitrary ad-hoc queries that are not necessarily foreseen at the time the database is created. It is based on a repository or matrix where object-to-object relations are stored; each entry in the matrix is representative of a type of relation between two classes of objects, one class corresponding to the column of the entry, while the other class corresponds to the line of the entry. The presence of an entry in the matrix, that is the presence of a bit at the crossing of a line and a column of the matrix, is representative of a relation from an object to another object. Even if an object-to-object relation exists, it does not, however, guarantee that an instance of the first object exists that relates to the second object, let alone determine whether specific instances exist. In fact, both objects may be without instances at all, yet the repository will show a relation between them.

Such systems are embodied in the Hyper-Relational Server owned and invented by TopTier Software of San Jose Calif. With a TopTier Hyper-Relational Server, contrary to systems based on the web hypertext metaphor, a user can generate arbitrary, ad-hoc queries. This system provides a solution to the need for enabling a user to easily generate arbitrary queries; it does not provide a solution to the problems listed above, notably to the problem of predicting the results of a query.

Therefore, what is needed is a system and method for predicting whether a query of an information system will result in an empty set, without having to actually run the query.

SUMMARY OF THE INVENTION

The present invention relates to methods and apparatus for generating an instance-to-object bitmap and using the instance-to-object bitmap to predict whether a query will produce a result. More particularly, in an information system comprising a database having objects and relations, the present invention provides a method for predicting whether a query will produce a result. The method comprises providing an instance-to-object bitmap which indicates whether instances of objects are related to other objects in a database, and accessing the bitmap to determine if the query will produce a result.

The instance-to-object bitmap may be generated off-line by computing paths from instances to neighboring objects by determining a path from an instance in an object to an instance in a neighboring object. Then, paths from instances to non-neighboring objects may be generated by merging a path from an instance in a first object to an instance in a second object with a computed path from said instance in said second object to said non-neighboring object. This can be repeated until paths from instances to remote objects are determined. In accordance with one embodiment of the invention, the lengths of the paths from instances to remote objects may be limited to a predetermined length. For example, a maximum path length of 5 may be used.

In accordance with one embodiment of the present invention, the instance-to-object bitmap may be used with TopTier's Hyper-Relational Server to determine whether dragging a draggable element onto a drop target will produce a query result.

In accordance with another embodiment of the present invention, the instance-to-object bit map easily can be used to create an object-to-object probability matrix that can be used to determine the likelihood of an arbitrary instance relating to another object. Thus, instead of using the usually larger bit map to unequivocally predict whether a query will produce a result, the probability matrix can be used to estimate the chance that such query will produce a result.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

This invention provides for predicting the results of queries in information systems comprised of objects and relations. It also provides for methods and apparatus for detecting and filtering-out queries, which will produce no records (i.e., an empty set). The present invention can be used with relational, object-oriented, or other suitable databases without modifying them in any way.

In the rest of the specification, the invention is described using an OLTP database; it should, however, be clear that the invention is not limited to such databases, but may apply to any type of system comprised of objects, instances and relations between them. For example, relations between OLTP objects and instances, OLAP objects and instances, web components or objects, and/or document components or objects are contemplated, to name but a few. In such systems, each of the objects typically are comprised of several instances.

One embodiment of the present invention preferably generates and uses an instance-to-object bitmap of a database. It works by keeping a bit-vector for each instance of each object in the system. The bit-vector is representative of the existence of a relation from the instance to all other classes or objects. In accordance with one embodiment of the present invention, the vector or bitmap is computed "off-line" before a query is generated. When a query is requested, the vector or bitmap may be accessed in run-time at low cost, and makes it possible to predict the results of the query in much less run-time than would actually be necessary for executing the query.

The invention also provides a method for computing an instance-to-object bitmap. As discussed in more detail below, the computation time to compute or generate the bitmap is O(N), where N is the total number of instances in the system.

The instance-to-object bitmap of a database, as well as the use of this instance-to-object bitmap now will be described in more detail. In the following example, upper-case letters A, B, etc. refer to objects or classes in a database. An instance of a class or object is noted with an index after the upper-case letter. Thus, $A_i$ denotes an instance in class A. In addition, let $A \rightarrow B$ denote a relation between classes or objects A and B. In a TopTier Hyper-Relational Server of the type disclosed in U.S. Pat. No. 5,848,424, the type of such class-to-class relations is stored in the repository.

Let $A_i \rightarrow B$ denote a relation between an instance in A to object B; let also $A_i \rightarrow B_j$ denote that the instances $A_i$ result in the instances $B_j$ when the relation $A \rightarrow B$ is applied. Last, let the double arrow $\rightarrow\rightarrow$ denote an indirect relation path.

Figure 1:
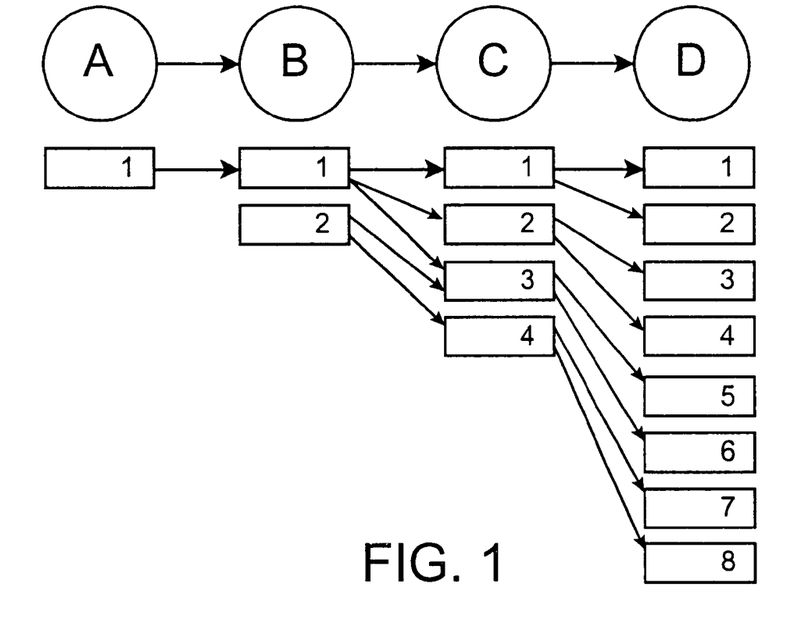
FIG. 1 is a block diagram showing the relationship of various objects and instances of the objects.

Referring now to FIG. 1, a block diagram showing the relationship of various objects and instances in a sample database is illustrated. For the sake of simplicity, this particular example only provides four objects or classes A–D. As illustrated, there exists class-to-class or object-to-object relations from A to B, from B to C and from C to D. Sample instances of each object are shown below each object. In the example of FIG. 1, only one instance $A_1$ of object A is represented, while eight instances $D_1$ to $D_8$ of object D are represented. The example in FIG. 1 only shows some instances of objects A–D for which there exists an instance-to-instance relation. In other words, there may exist in the database other instances $A_2$ to $A_n$ of object A, other instances $D_9$ to $D_m$ of object D, etc. Also, other instance-to-instance relations may exist, but are not shown for the sake of simplicity.

Assume a user wants to query all the instances of D to which $A_1$ relates. Typically, a query must be done to obtain each $B_i$ to which $A_1$ relates. Then for each of the resulting $B_i$, a new query needs to be executed to get a set of $C_{i,k}$ to which each $B_i$ relates. These then need to be distinctly merged to produce a set $C_k$. The process needs to be repeated one more time to get a distinct set of $D_j$ to which the instances $C_k$ relate. In other words, the indirect relation from $A_1$ to instances $D_j$ of object D equals relations from instance $A_1$ to instances $B_i$, from instances $B_i$ to instances $C_k$, and from instances $C_k$ to instances $D_j$.

$$A_1 \rightarrow\rightarrow D_j = A_1 \rightarrow B_i \& B_i \rightarrow C_k \& C_k \rightarrow D_j$$

The order of magnitude of calculating such a relation is the number of instances to the power of the length of the path. For the entire schema—for any possible relation—computation time equals the total number of instances to the power of the number of objects (representative of the length of the paths) times the number of objects (for each different source). Memory requirements are even higher due to the fact that duplicate records may be returned. Computation time is thus:

$$O(V*N^V)$$

Using the well-known mathematical notation O(x), V is the number of objects and $N = \Sigma_{i=1 \ldots V} |V_i|$ is the total number of instances.

Moreover, many times multiple database accesses may be needed for this kind of calculation. Typically, database time is a precious and scarce resource. While the database is busy, all users, including the one running the query, must wait. In the example above, at least three accesses are needed to calculate a single instance.

The present invention, thus, helps prevent run-time computations that produce no result. It does that by providing an instance-to-object bitmap of the database that is used to predict whether a query will produce any records. The bitmap may be a bit-vector for each instance of each object in the system; the bit-vector being representative of the existence of a relation from the instance to some or all other classes or objects in the system. In the example of FIG. 1, for instance $A_i$, the instance-to-object bitmap would indicate:

the existence or non-existence of a relation from instance $A_i$ to object B;

the existence or non-existence of a relation from instance $A_i$ to object C; and the existence or non-existence of a relation from instance $A_i$ to object D.

The instance-to-object bitmap makes it possible to compute efficiently and rapidly whether a result to a query exists. In the example of FIG. 1, consulting the bitmap vector for instance $A_1$ evidences that there exists a path from instance $A_1$ to object D, and therefore that the query for all instances of D to which $A_1$ relates will return at least a result. Accessing the instance-to-object bitmap is possible in a fraction of a second, and is significantly faster than actually completing the query. For all other instances $A_i (i \neq 1)$, the bitmap will indicate that there is no relation to any of the objects B–D.

The invention thus makes it possible to predict the result of a query, or more specifically, to predict whether a given query will produce a result or not. This allows a user or a client program run by a user to select queries, or to abort queries that will not produce a result before any database access is performed.

The instance-to-object bitmap cannot only answer whether a relation exists, but as a by-product, it also can enumerate in run-time all viable relations for a given instance. In this context, viable relations are those relations that will produce a result. A system enabled with this technology can guide the user through navigation in a relational or other database environment, suggesting or allowing only paths that will actually produce a result. This capability may be used with TopTier's Hyper-Relational Server or any other database access technology. For example, in the case of TopTier's Hyper-Relational Server, any time a user drags an element in the interface and brings it over a drop target, the system can be configured so that the target is highlighted to indicate that the query will actually provide a result. This helps the user navigate in the interface by informing the user when dropping an element onto a drop target will not produce a query result, thus preventing the user from wasting time with such a query. Of course, other methods for advising the user that the query will or will not produce a result may be contemplated.

Figure 2:
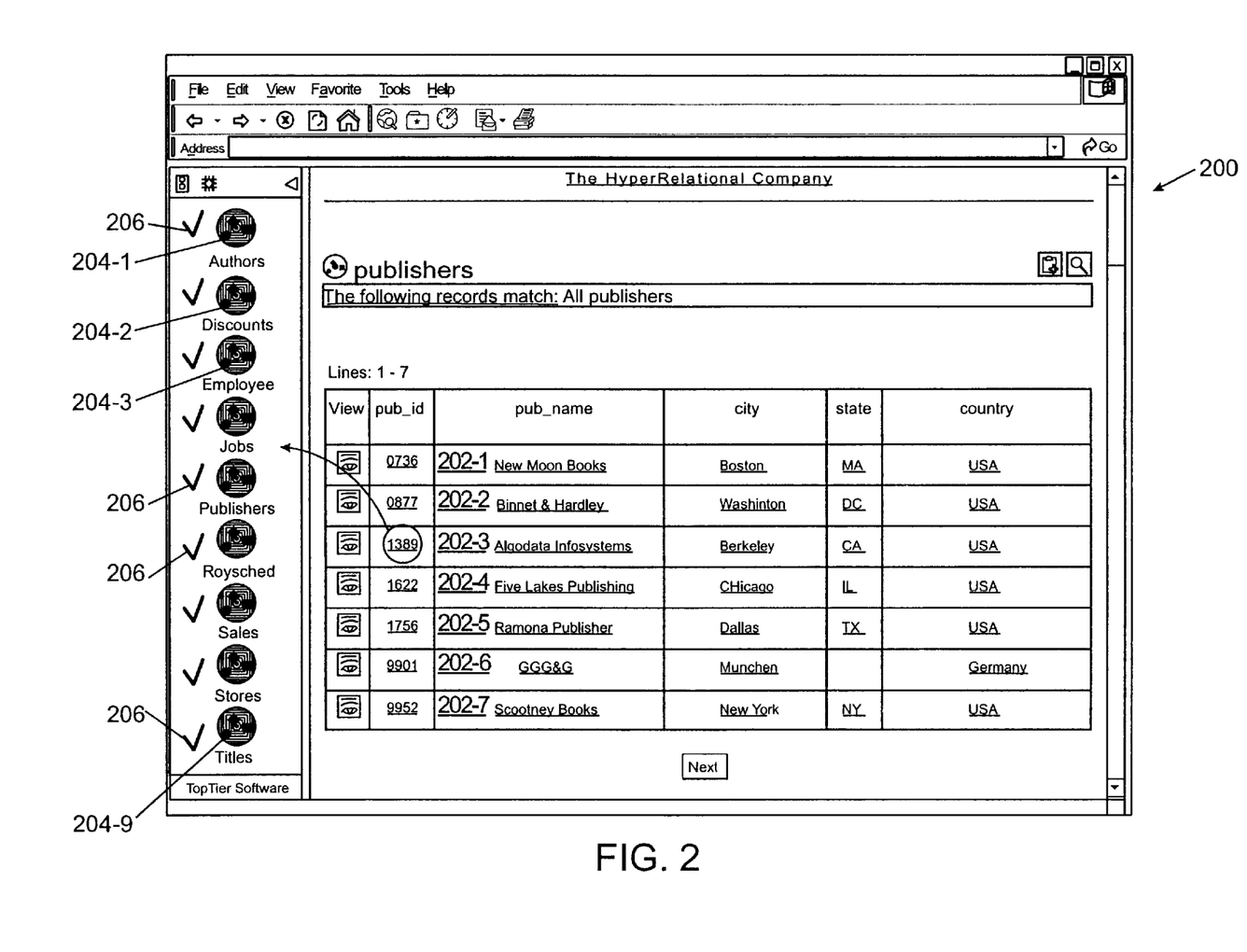
FIG. 2 is an illustration of a web page showing how the web page indicates that relationships exist between an instance and other objects.
Figure 3:
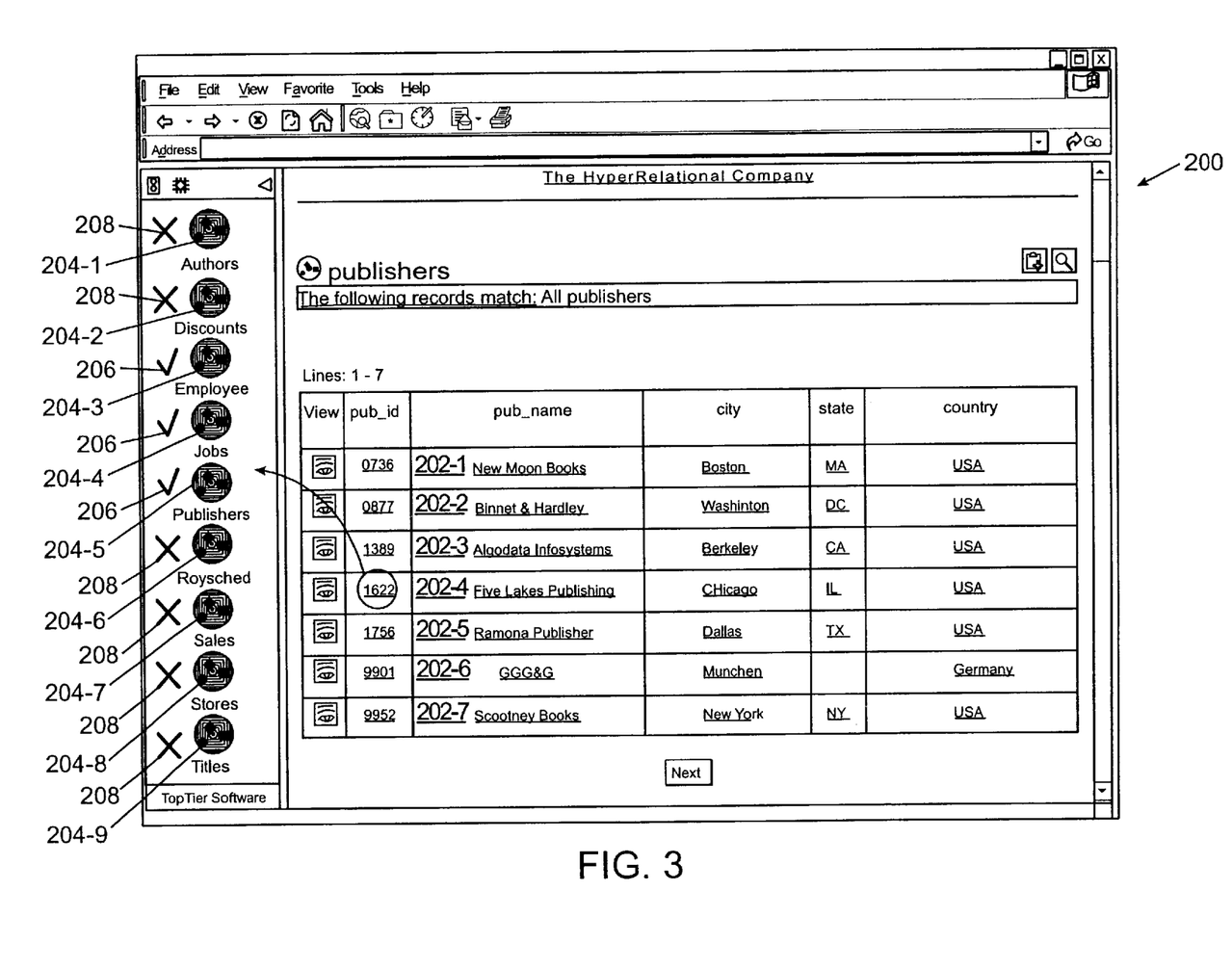
FIG. 3 is another illustration of a web page showing how the web page indicates that relations exist or do not exist between an instance and other objects.

In accordance with another embodiment of the present invention, the system and method of the present invention will be able to list all objects to which a particular instance relates. Accordingly, it will be possible to enumerate to a user those viable queries that will produce a result, thus proving a guided-navigation through particular data. This may be done by scanning the vector bitmap for a given instance and displaying a list of those objects to which there exists a relation from the given instance. As one skilled in the art will appreciate, the list may be presented to the user in a variety of forms. For example, FIGS. 2 and 3 show one way of presenting this information to a user. FIG. 2 illustrates a web page 200 listing a plurality of instances 202 and a plurality of objects or drop targets 204. In the example of FIG. 2, instance 202-3 is being dragged over to drop targets 204. The check marks 206 next to the drop targets or objects 204 signify that a relationship exists between instance 202-3 and the objects or drop targets, and thus dropping instance 202-3 onto any one of objects 204 will produce a query result. If no relationship exists between an instance and an object, an 'X' 208 is used to show the user that there is no relationship (see FIG. 3). As illustrated in FIG. 3, instance 202-4 has a relationship with objects 204-3, 204-4, and 204-5 as denoted by check marks 206, but does not have a relationship with objects 204-1, 204-2, 204-6, 204-7, 204-8 or 204-9 as denoted by 'Xs' 208.

According to yet another embodiment of the present invention, the relation bitmap may be stored only for paths under a predetermined length. This will reduce off-line computation time of the bitmap, and under usual circumstances will not cause any problem to the user. Indeed, it appears that in most relational databases, paths of increased length are usually less important. In accordance with one embodiment of the present invention, the predetermined number of path lengths is five. Thus, in this case, a relation is only stored in the instance-to-object bitmap if the path from the instance to the last object is less than or equal to five objects.

The instance-to-object bitmap of the present invention may be embodied in a variety of forms. As described above, it may be stored as a vector $(P_i, i=1 \ldots V)$, where $P_i$ is representative of the existence of a path from the instance to object number i. In this case, the size of a vector is as the number of possible paths from the instance to other objects. In accordance with other embodiments of the present invention, the instance-to-object bitmap also may be stored as a matrix, or any other suitable form.

The instance-to-object bitmap of the present invention basically is very different from existing instance-to-instance index tables. As discussed above, the present invention can be used to predict whether a result exists, while an instance-to-instance index table typically is used to provide the answer to a query. In the example of FIG. 1, an instance-to-instance table would indicate that instance $A_1$ of object A is related to instances $B_1$ and $B_2$ of object B. This makes it possible to provide the answer $B_1$ and $B_2$ to the query "how is instance $A_1$ related to object B". The instance-to-object bitmap of the present invention makes it possible to predict that there exists an answer to the query, but does not provide the answer. Given that the instance-to-object bitmap of the present invention typically provides less information than a prior art instance-to-instance index table, the instance-to-object bitmap of the present invention typically is much smaller than an instance-to-instance index table, thus taking up much less memory and/or storage space. For example, in the example given above, the instance-to-instance index table of the prior art indicates that there exists a relation between $A_1$ and $B_1$, as well as a relation between $A_1$ and $B_2$. However, the instance-to-object bitmap of the present invention only indicates that there exists a relation from $A_1$ to object B, but does not specify what those relations are.

The computation or generation of the instance-to-object bitmap now will be described. In particular, the bitmap of the present invention may be computed using various methods. In accordance with one embodiment of the present invention, the bitmap may be computed by simply running queries to determine all instances-to-object relations. However, as discussed above, the necessary run time for all the queries is $O(V*N^V)$, which is a considerable amount of time.

Thus, in accordance with another embodiment of the present invention, there is a process for facilitating and accelerating computation of the instance-to-object bitmap. In accordance with this embodiment of the present invention, an algorithm for "off-line" computation of the instance-to-object bitmap is presented, which runs significantly faster than its on-line counter part. Therefore, the necessary computation time for establishing the instance-to-object bitmap preferably is shortened, saving run-time. In this context, "off-line" only means that the bitmap is computed prior to using it to predict the results of queries. One skilled in the art will appreciate that the system may be running for other purposes while generating the bitmap.

In accordance with one embodiment of the present invention, the instance-to-object bitmap is generated by suffix completion. Suffix completion is based on the observation that in order to compute an indirect relation path $A_i \to \to D$ from instance $A_i$ to object D, it is possible to compute $B_j \to \to D$ first, then $A_i \to B_j$ and finally merge the two. This method allows the algorithm to reuse paths, which have already been computed to compute longer paths.

Figure 4:
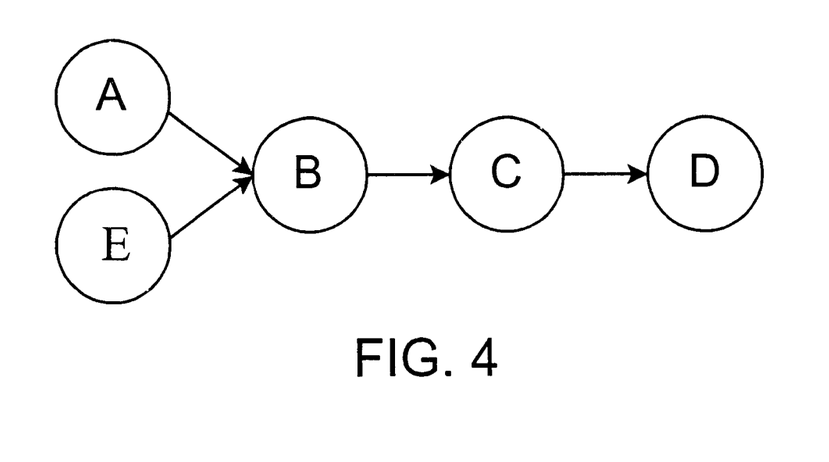
FIG. 4 is a block diagram showing the relations of various objects.

Referring now to FIG. 4, an example of suffix completion will be described. FIG. 4 is a block diagram showing the relations of various objects. In the embodiment of FIG. 4, five objects A–E are provided with four relations between them. The four relations are from A to B, from B to C, from C to D and from E to B. In this example, the computation of indirect relation path $B_j \to \to D$ from instances $B_j$ to object D serves as a pre-computed suffix for computing both indirect relation paths $A_i \to \to D$ from instances $A_i$ to object D and indirect relation path $E_m \to \to D$ from instances $E_m$ to object D. This way, the complete set of instance-to-object relations can be computed in an order of magnitude of the number of instances.

One embodiment of a method for computing an instance-to-object bitmap now will be explained in further detail. First, neighboring objects are determined for each instance in the information system. This may be done, for example, using an instance-to-instance index table of the type known in the art, or queries can be used to determine these relations.

At the next step, instance-to-object relation paths having a length of two are computed. This may be done using instance-to-neighboring object relation paths computed in the previous step. These pre-computed relation paths are then used as suffixes for computing longer relation paths. The same step may be repeated as many times as necessary to generate instance-to-object relation paths having larger lengths. Each time the step is repeated, new instance-to-object relation paths are added, wherein each new path has a length longer by one object than the length of the relation paths computed in the previous step. For example, in the example of FIG. 4, the instance-to-object relation paths from instances $B_j$ to D have a length of two. These paths then may be used for computing instance-to-object relation paths from instances $A_i$ to object D and from instances $E_m$ to object D; these relation paths have a length of three.

At each step, computation time is of the order of magnitude of the number of instances. In the worst case, all instances may be used as the starting point of an instance-to-object relation path. Thus, computation time for the complete process then is O(N), where $N = \Sigma_{i=1 \ldots v} |Vi|$ is the total number of instances.

Limiting the depth of the algorithm to paths of less than a predetermined length, as discussed above, further can reduce the computation time by limiting the number of steps in the process. A depth of 5, as in the example given above, will limit the algorithm to store a relation bitmap only for paths whose length does not exceed 5 objects. This will not compute the full set of relations, but may be desirable as paths of increased length are usually less important.

In order to speed up the computation time of the bitmap, it may be desirable to limit access to the information system while the instance to object bitmap is being computed. That is, as discussed above, the instance-to-object bitmap presumably is computed "off-line" before generating queries for which prediction is necessary. However, as one skilled in the art will appreciate, the information system may be used for other purposes; e.g., for queries in which prediction is not needed. Minimizing load on the information system is therefore important, especially in real-time transactional databases where server availability is of the utmost importance.

In accordance with another embodiment of the present invention, caching of relational maps may be used to increase the speed of "off-line" computation of the bitmap. As one skilled in the art will appreciate, a relational map is a table of pairs of keys—one key for each object of the relation. In relational databases that would be an inner join of the two tables whose join is explored. By caching this map for each of the relations in the system, the algorithm need not query the system more than once per relation, thus significantly minimizing the load on the system. For example, in order to calculate $A_i \to D$, the algorithm will query the database for the joins $C_k \to D$, then $B_j \to C$, and then $A_i \to B$, as described above. In order to calculate the reverse relations $D_1 \to A$, there is no need to query the database again. The join-tables between each two adjacent tables are already cached locally by the algorithm.

Also, the cached join-tables may be sorted after being queried. This allows for faster merging of bitmaps. For example, after calculating the bitmap of all instances $B_j$ (to objects C and D), the algorithm queries for the join-table $A_i \to B_j$. It sorts this list in order of instances $A_i$ and then it runs on all instances $A_i$ (not just those currently returned from the join) and looks for all occurrences in the cached join-table in which $A_i$ relates to $B_j$. If it finds a relevant occurrence, it ORs the bitmap with the bitmap of the related instance in B. By using the cached join-tables in this manner, the search takes O(log N) not O(N).

Referring now to flowchart 500 in FIG. 5, a process or method for computing an instance-to-object bitmap and predicting results of queries using the same will be discussed. The first part of the flowchart, from the start to step 508 corresponds to the computing of the instance-to-object bitmap. The second part of the process, from step 510 to 518, embodies predicting results of queries. After start, at step 502, for each instance of a database, the relation paths to neighboring objects are determined; a variable L is set to 1.

At step 504, for each suffix path of length L, instance-to-object relation paths of length L+1 are computed; the process proceeds to step 506, where L is increased by 1.

At next step 508, it is determined whether a predetermined maximum length $L_{max}$ is reached; if this is the case, the process proceeds to step 510, otherwise, it goes back to step 504. Looping through steps 504, 506 and 508 adds instance-to-object relation paths of increasing lengths. At each loop, the number of new paths is likely to decrease. In any event, one will eventually obtain a bitmap of instance-to-object relations.

At step 510, a new query is expected. When a request for a query is received, the process proceeds to step 512, where the instance-to-object bitmap is accessed. By accessing the instance-to-object bitmap, the system can predict whether the query request will generate a query with results. At step 514, if the existence of a result is predicted, the process proceeds to step 516, otherwise it proceeds to step 518. At step 516, the query is executed, and the process returns to step 510. At step 518, the query is aborted and the process then returns to step 510.

Figure 5:
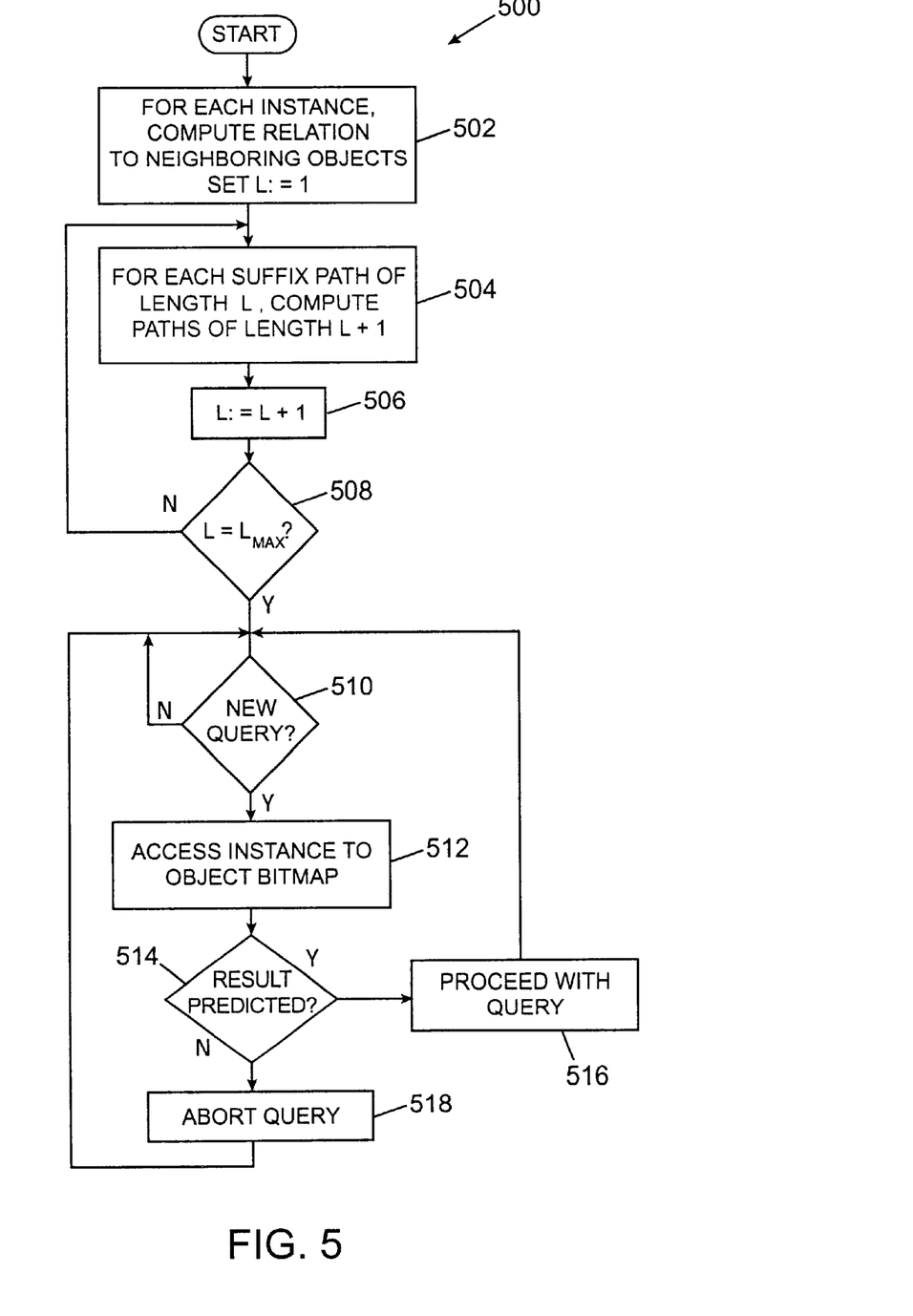
FIG. 5 is a flowchart of a process for computing an instance to object bitmap and predicting results of queries using the same.

Flowchart 500 of FIG. 5 is merely an example of one possible embodiment of the present invention. In accordance with another embodiment of the present invention, the process for generating the bitmap may be totally separate from the process of using the bitmap to predict the result of a query. That is, with reference to FIG. 5, the top portion of flowchart 500 is separate from and run at a different time from the bottom portion of flowchart 500. In any event, the present invention is not limited to the illustrated embodiment.

Figure 6:
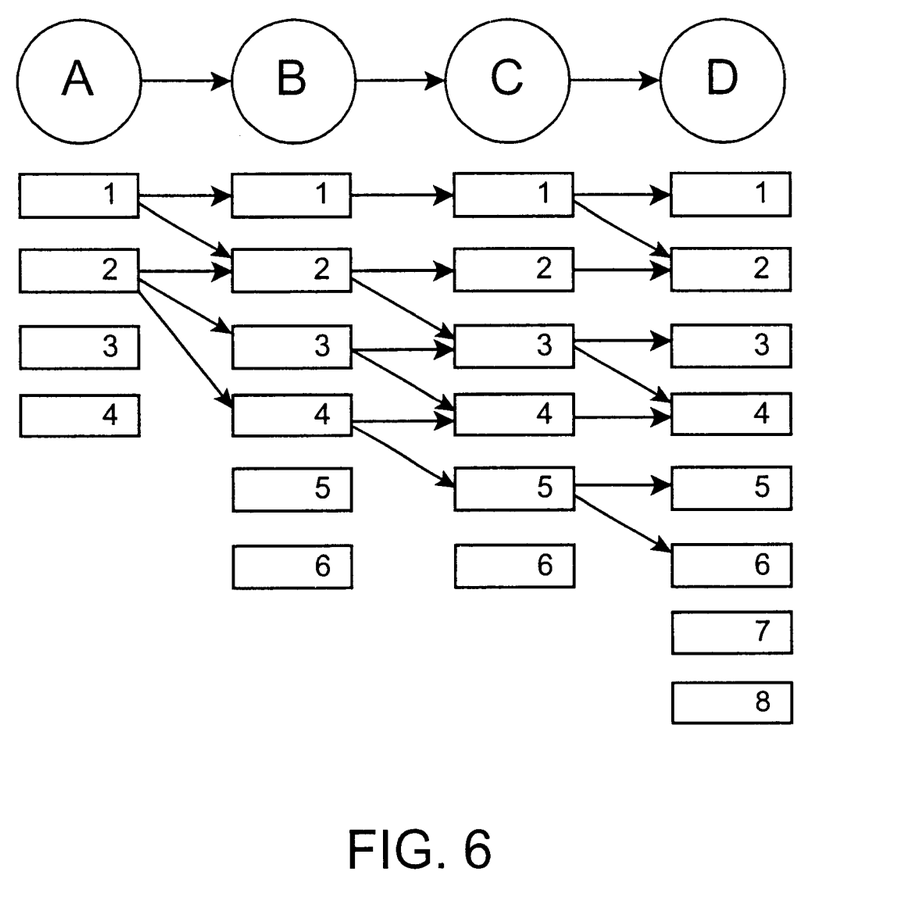
FIG. 6 is a block diagram showing the relationship of various objects and instances of the objects.

Referring now to FIG. 6, another embodiment of the present invention will be discussed. In accordance with this particular embodiment of the present invention, instead of using an instance-to-object bitmap to determine a whether a relationship exists or if a query will produce a result, an object-to-object probability matrix is used. The object-to-object probability matrix does not indicate whether a particular instance relates to another object, but merely indicates the likelihood or probability that the instance will relate to the object. This is achieved by dividing the number of instances of a first object that relate to a second object by the total number of instances of the first object. An instance-to-object bitmap may be used to determine the number of instances in the first object that relate to the second object.

Still referring to FIG. 6, a specific example will be given. As illustrated in FIG. 6, object A comprises 4 instances. However, only 2 instances ($A_1$ and $A_2$) relate to object B. Therefore, the likelihood or probability that an arbitrary instance in object A will relate to object B is 50% (2/4). Similarly, object B comprises 6 instances, 4 of which relate to object C, and object C comprises 6 instances, 5 or which relate to object D. Therefore, the likelihood or probability that an arbitrary instance in object B will relate to object C is 66% (4/6) and the likelihood or probability that an arbitrary instance in object C will relate to object D is 83.3% (5/6).

To calculate the probability of a relation of objects having a path length greater than one, the probability of the shorter paths are multiplied together. For example, the likelihood that an arbitrary instance in object A relates to object C is calculated by multiplying the probability between object A and object B with the probability between object B and object C. In this example, the likelihood that an arbitrary instance in object A relates to object C is 50%*66%=33%. Similarly, the likelihood that an arbitrary instance in object A relates to object D is 27.78% (50%*66%*83.3%), and the likelihood that an arbitrary instance in object B relates to object D is 55.56% (66%*83.3%).

In conclusion, the present invention provides systems and methods for notifying a user in runtime that a specific query (e.g., a Drag-and-Relate operation in Top-Tier's Hyper-Relational Server) will produce no result or no records without having to run the query or access the databases. In addition, the present invention can be used to enumerate viable navigation targets for certain instances and can be used to indicate the probability of a relation returning a result. Moreover, the invention provides for a method for off-line computation of an instance-to-object bitmap and an object-to-object probability matrix. While a detailed description of presently preferred embodiments of the invention have been given above, various alternatives, modifications, and equivalents will be apparent to those skilled in the art. For example, while the algorithm of the present invention is presented as being used for OLTP databases, it is not limited to OLTP. The present invention can be used with any system that is built around objects and the relations among them. Therefore, the above description should not be taken as limiting the scope of the invention, which is defined by the appended claims.

What is claimed is:

1. In an information system comprising objects, instances of said objects and relationships between at least some of said objects and said instances of said objects, a method for predicting whether a query will produce a result, the method comprising the steps of:

providing an instance-to-object bitmap which indicates whether instances of objects are related to other objects; and accessing the bitmap to determine if the query will produce a result.

2. The method of claim 1, wherein the step of providing an instance-to-object bitmap comprises generating the instance-to-object bitmap by:

computing paths from instances to neighboring objects by determining a path from an instance in an object to an instance in a neighboring object; and computing a path from an instance to a non-neighboring object by merging a path from an instance in a first object to an instance in a second object with a computed path from said instance in said second object to said non-neighboring object.

3. The method of claim 2, wherein the step of computing a path from an instance to a non-neighboring object is repeated.

4. The method of claim 2, wherein the step of computing a path from an instance to a non-neighboring object is repeated until relation paths of a predetermined length are computed.

5. The method of claim 3, wherein the step of providing an instance-to-object bitmap comprises providing an instance-to-object bitmap which indicates whether each instance of an object is related to all other objects by a relation path having a length equal to or lower than a predetermined length.

6. The method of claim 1, wherein the step of providing comprises providing an instance-to-object bitmap indicating whether each instance of an object is related to all other objects by a relation path having a length equal to or lower than a predetermined length.

7. An information system comprising objects, instances of said objects, relationships between at least some of said objects and said instances of said objects, and an instance-to-object bitmap indicating whether instances of objects are related to other objects.

8. The information system of claim 7, wherein said instance-to-object bitmap indicates whether an instance of an object is related to other objects by a relation path having a length equal to or lower than a predetermined length.

9. The information system of claim 7, further comprising means for aborting a query from an instance to an object when said instance-to-object bitmap indicates that the instance is not related to the object.

10. The information system of claim 7, further comprising a data navigator interface with at least a draggable element and at least a drop target, a query being generated when a draggable element is dragged and droped onto a drop target.

11. The information system of claim 10, further comprising means for aborting said query when said instance-to-object bitmap indicates that the draggable element is not related to the drop target.

12. The information system of claim 10, further comprising means for displaying on said interface that a query will not produce any result when said instance-to-object bitmap indicates that the draggable element is not related to the drop target.

13. In an information system comprising objects, instances of said objects and relationships between at least some of said objects and said instances of said objects, a method for generating an instance-to-object bitmap, comprising the steps of:

computing paths from instances to neighboring objects by determining a path from an instance in an object to an instance in a neighboring object; and computing a path from an instance to a non-neighboring object by merging a path from an instance in a first object to an instance in a second object with a computed path from said instance in said second object to said non-neighboring object.

14. The method of claim 13, wherein the step of computing a path from an instance to a non-neighboring object is repeated.

15. The method of claim 13, wherein the step of computing a path from an instance to a non-neighboring object is repeated until relation paths of a predetermined length are computed.

16. The method of claim 15, wherein said instance-to-object bitmap is used to predict whether a query will produce a result.

17. In an information system comprising objects, instances of said objects and relationships between at least some of said objects and said instances of said objects, a method for predicting a likelihood of whether a query will produce a result, the method comprising the steps of:

providing an object-to-object probability matrix, which indicates a likelihood that an instance of an object is related to another object; and accessing the probability matrix to determine a likelihood that the query will produce a result.

18. The method of claim 17, wherein the step of providing an object-to-object probability matrix comprises generating the object-to-object probability matrix by:

for each object, computing a probability that an instance in an object is related to a neighboring object; and computing probabilities that instances in objects are related to non-neighboring objects using the probabilities computed in the previous step.

19. The method of claim 18, wherein the step of computing a probability that an instance in an object is related to a neighboring object comprises:

determining a number of instances in a first object related to a neighboring second object; and calculating the probability that an instance in said first object is related to said neighboring second object by dividing the number of instances in said first object related to said neighboring second object by a total number of instances in said first object.

20. The method of claim 19, wherein the step of computing probabilities that instances in objects are related to non-neighboring objects comprises:

computing a first probability that an instance in a first object is related to a second object, said second object neighboring said first object;

computing a second probability that an instance in said second object is related to a third object, said third object neighboring said second object; and computing a third probability that said first object is related to said third object, said third object not neighboring said first object, by multiplying said first probability by said second probability.

21. The method of claim 19, wherein the step of determining a number of instances in a first object that are related to a second object comprises using an instance-to-object bitmap to determine which instances of said first object are related to said second object.

22. The method of claim 21, wherein said instance-to-object bitmap is generated by:

computing paths from instances to neighboring objects by determining a path from an instance in an object to an instance in a neighboring object; and computing a path from an instance to a non-neighboring object by merging a path from an instance in a first object to an instance in a second object with a computed path from said instance in said second object to said non-neighboring object.

23. The method of claim 22, wherein the step of computing a path from an instance to a non-neighboring object is repeated.

* * * * *